US012329718B2

(12) United States Patent
Johnson

(10) Patent No.: US 12,329,718 B2
(45) Date of Patent: Jun. 17, 2025

(54) PUMP ASSEMBLY

(71) Applicant: RAPID REBOOT RECOVERY PRODUCTS LLC, Lindon, UT (US)

(72) Inventor: David K. Johnson, Lindon, UT (US)

(73) Assignee: RAPID REBOOT RECOVERY PRODUCTS LLC, Lindon, UT (US)

( * ) Notice: Subject to any disclaimer, the term of this patent is extended or adjusted under 35 U.S.C. 154(b) by 960 days.

(21) Appl. No.: 17/194,122

(22) Filed: Mar. 5, 2021

(65) Prior Publication Data

US 2021/0275387 A1 Sep. 9, 2021

Related U.S. Application Data

(60) Provisional application No. 62/985,496, filed on Mar. 5, 2020.

(51) Int. Cl.
*A61H 9/00* (2006.01)
*F04B 35/04* (2006.01)
*F04B 53/10* (2006.01)

(52) U.S. Cl.
CPC ........... *A61H 9/0092* (2013.01); *F04B 35/04* (2013.01); *F04B 53/10* (2013.01); *A61H 2201/1207* (2013.01); *A61H 2201/1409* (2013.01)

(58) Field of Classification Search
CPC .. A61H 9/0092; A61H 9/0078; A61H 9/0071; A61H 9/0085; A61H 2201/0103; A61H 2205/106; A61H 23/04; A41D 13/0155; A41D 13/018; Y10S 2/03; A61F 13/06; A61F 13/08; A61F 13/085
See application file for complete search history.

(56) References Cited

U.S. PATENT DOCUMENTS

| | | | | |
|---|---|---|---|---|
| 4,865,020 A * | 9/1989 | Bullard | A61H 9/0078 | 601/152 |
| 5,437,610 A * | 8/1995 | Cariapa | A61H 9/0078 | 128/DIG. 20 |
| 5,951,502 A * | 9/1999 | Peeler | A61H 9/0078 | 601/149 |
| 5,968,073 A * | 10/1999 | Jacobs | A61B 34/74 | 601/152 |
| 6,558,338 B1 * | 5/2003 | Wasserman | A61H 9/0078 | 601/152 |

(Continued)

FOREIGN PATENT DOCUMENTS

WO 9200715 A1 1/1992

OTHER PUBLICATIONS

International Search Report and Written Opinion for PCT/US2021/021221 dated Jun. 14, 2021.

*Primary Examiner* — Joseph D. Boecker
*Assistant Examiner* — Brian T Khong
(74) *Attorney, Agent, or Firm* — Dorsey & Whitney LLP

(57) ABSTRACT

An apparatus for applying pressure to a body part includes a sleeve configured to at least partially surround a body part. The sleeve can include a plurality of inflatable sections and a pump assembly. The pump assembly can include a pump and a plurality of channels. Each channel can be configured to be in fluid communication with the pump and a respective inflatable section, wherein each channel can include a supply valve configured to regulate air entering the respective inflatable section and a release valve configured to regulate air exiting the respective inflatable section.

10 Claims, 11 Drawing Sheets

(56) References Cited

U.S. PATENT DOCUMENTS

| | | | | |
|---|---|---|---|---|
| 2001/0000262 | A1* | 4/2001 | McEwen | A61H 9/0078 601/11 |
| 2005/0027221 | A1* | 2/2005 | Calderon | A61H 9/0078 602/13 |
| 2005/0126578 | A1* | 6/2005 | Garrison | A61H 9/0078 128/874 |
| 2005/0154336 | A1* | 7/2005 | Kloecker | A61F 13/085 5/710 |
| 2016/0175184 | A1* | 6/2016 | Arkans | A61H 23/0263 601/149 |

* cited by examiner

PUMP ASSEMBLY

CROSS-REFERENCE TO RELATED APPLICATION

This application is a non-provisional patent application of, and claims priority to, U.S. Provisional Patent Application No. 62/985,496 filed Mar. 5, 2020, and entitled "Pump Assembly," the disclosure of which is hereby incorporated by reference in its entirety.

FIELD

The described embodiments relate generally to a device for providing physical therapy to a body part. More particularly, the present embodiments relate to a compression sleeve configured to perform compression therapy on a body part.

BACKGROUND

The circulatory system provides oxygen, nutrients, and hormones to cells in the human body. The circulatory system is also responsible for flushing the body of toxins by removing metabolic wastes such as carbon dioxide and lactic acid.

Compression therapy involves compressing or applying pressure to a portion of a body part. Compression therapy can be used to enhance blood flow to specific parts of the body, encouraging the body to deliver more oxygen and nutrients to those areas, which in turn can speed up recovery, relieve pain and improve athletic performance. The benefits of compression therapy include enhanced blood flow, reduced swelling and inflammation, faster muscle recovery, delayed-onset muscle soreness prevention, relieved pain, increased flexibility and range of motion, removal of lactic acid, and decreased muscle fatigue.

SUMMARY

According to some examples of the present disclosure, an apparatus for applying pressure to a body part includes a sleeve configured to at least partially surround a body part. The sleeve can include a plurality of inflatable sections and a pump assembly. The pump assembly can include a pump and a plurality of channels. Each channel can be configured to be in fluid communication with the pump and with a respective inflatable section, wherein each channel can include a supply valve configured to regulate air entering the respective inflatable section and a release valve configured to regulate air exiting the respective inflatable section.

In some examples, the supply valves and the release valves include solenoid valves. The pump can be operated by a DC motor. The apparatus can further include a user interface. In some examples, air can be transferred from one inflatable section to another. A pressure sensor can be used to monitor pressure within the pump assembly. The pump assembly can be configured to inflate the respective inflatable section by opening the supply valve and closing the release valve. The pump assembly can be configured to actively deflate the respective inflatable section by opening the release valve and closing the supply valve.

According to some examples of the present disclosure, a pump assembly for applying pressure to a body part can include a pump and a set of isolated pressure systems. Each isolated pressure system can include a port configured to fluidly connect to a respective chamber, a positive-flow valve in fluid communication with the pump and configured to provide positive pressure to the port, and a negative-flow valve in fluid communication with the pump and configured to provide negative pressure to the port.

In some examples, the pump assembly includes rechargeable batteries. The isolated pressure system can be configured to inflate the chamber by opening the positive-flow valve and closing the negative-flow valve. The isolated pressure system can be configured to actively deflate the chamber by opening the negative-flow valve and closing the positive-flow valve. The pump assembly can include an inlet control valve configured to control air entering the system.

In some examples, the pump assembly includes an outlet control valve configured to control air exiting the system. The pump assembly can be configured for use with a compression sleeve. In some examples, each isolated pressure system is fully customizable, independent from one another. The pump can provide between 14-20 cubic feet of air per minute. The pump assembly can include at least four isolated pressure systems.

According to some examples of the present disclosure, a method of applying pressure to a body part includes providing a pump configured to generate air pressure, providing a sleeve configured to at least partially surround a body part, the sleeve comprising a plurality of inflatable chambers configured to be in fluid communication with the pump, providing pathways between a supply valve and a return valve to each inflatable chamber of the plurality of inflatable chambers, and varying the air pressure within each inflatable chamber through operation of the pump, the supply valves, and the return valves.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents, as can be included within the spirit and scope of the described embodiments, as defined by the appended claims.

Compression therapy involves applying pressure to a region of the body. Compression therapy can, among other things, be used to enhance blood flow to specific parts of the body, encouraging the body to deliver more oxygen and nutrients to those areas, which in turn can speed up recovery, relieve pain, and improve athletic performance. The following disclosure relates to an apparatus for applying compression therapy to a region of the body. More specifically, the following disclosure relates to a pump assembly and a compression sleeve including isolated inflatable chambers.

These and other embodiments are discussed below with reference to FIGS. 1-11. However, those skilled in the art will readily appreciate that the detailed description given herein with respect to these figures is for explanatory purposes only, and should not be construed as limiting.

Figure 1:
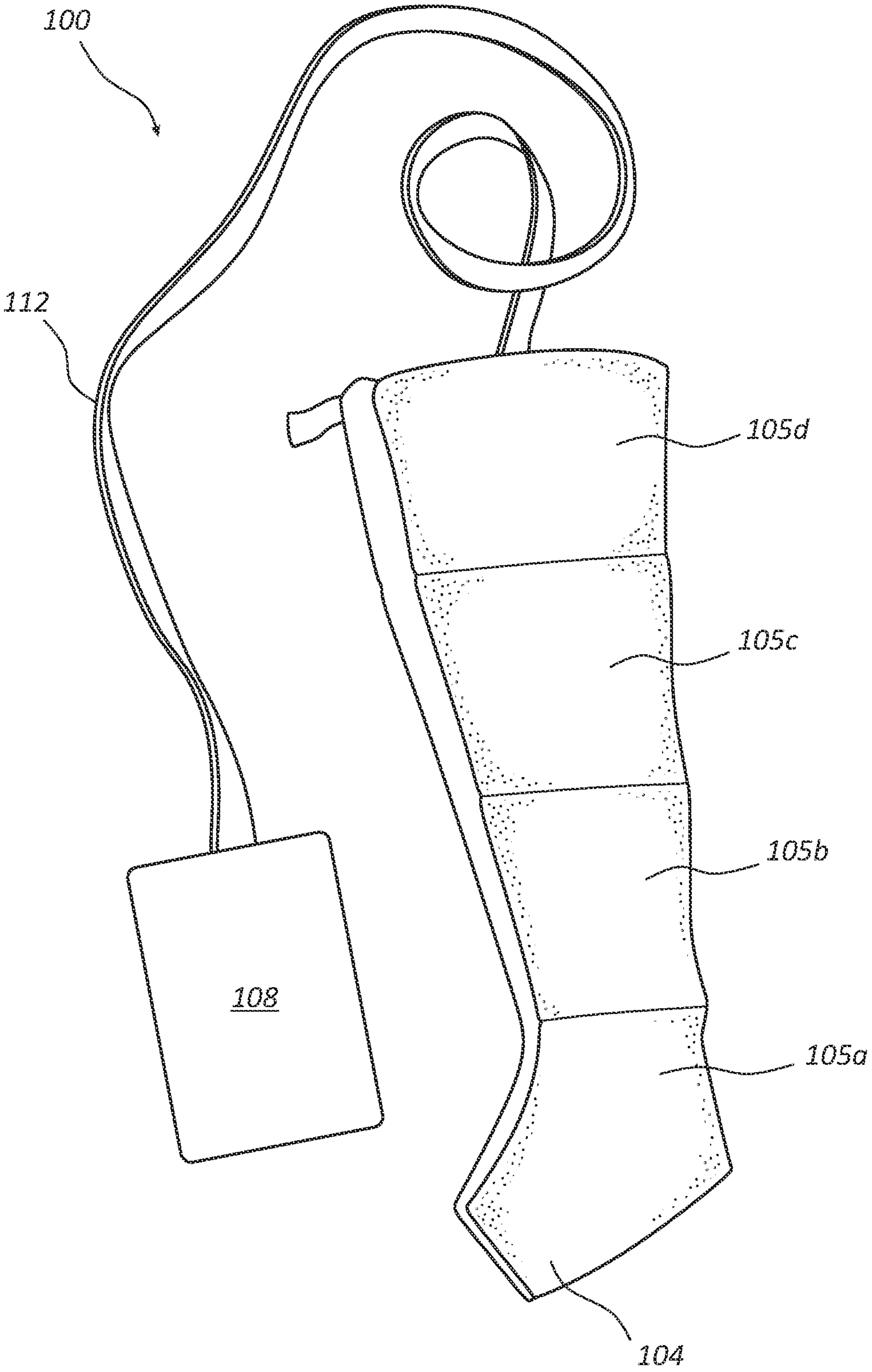
FIG. 1 shows an exemplary physical therapy system including a pump assembly and a compression sleeve.

FIG. 1 illustrates a physical therapy system 100 for delivering compression therapy to a body region of a wearer, such as a leg, arm, hip, shoulder, torso, etc. The system 100 can include a compression sleeve 104 and a pump assembly 108. The pump assembly 108 and the compression sleeve 104 can be in fluid communication through a tubing 112.

The compression sleeve 104 can be configured to at least partially surround a body part. In some examples, the compression sleeve 104 can include a plurality of inflatable chambers or sections 105*a*, 105*b*, 105*c*, 105*d* (collectively 105). The inflatable chambers 105 can be defined by the fabric of the compression sleeve 104 and can be isolated from one another. The chambers 105 can be configured to receive air and expand (i.e., inflate) to apply pressure to the body part of the wearer. Each chamber 105 can be in fluid communication with the pump assembly 108 via the tubing 112. The tubing 112 can include a plurality of hoses. In some examples, the tubing 112 includes one hose for each chamber 105. For instance, in the illustrated example of FIG. 1, there are four chambers 105 on the sleeve 104. Accordingly, the tubing 112 can include four distinct hoses, each leading to a respective chamber. In this manner, each chamber 105 can include and benefit from an isolated and independent fluid communication with the pump assembly 108.

In some examples, the compression sleeve 104 can include a fastening system (not shown), such as zippers, buttons, snaps, latches, hook and loop fasteners, laces, or any other suitable fastening system that can be positioned on, in, or around the compression sleeve 104. The fastening system can be loosened or undone to open the compression sleeve 104, and attached or secured to close/seal the compression sleeve 104. In some examples, the compression sleeve 104 includes a zipper that runs along at least a portion of the length of the compression sleeve 104. When unzipped, the compression sleeve 104 can be opened to more easily receive a body part of the user, such as an arm or leg. The zipper can then be zipped-up to secure the limb within the compression sleeve 104. Further details of the pump assembly 108 are provided below with respect to FIGS. 2-10.

Figure 2:
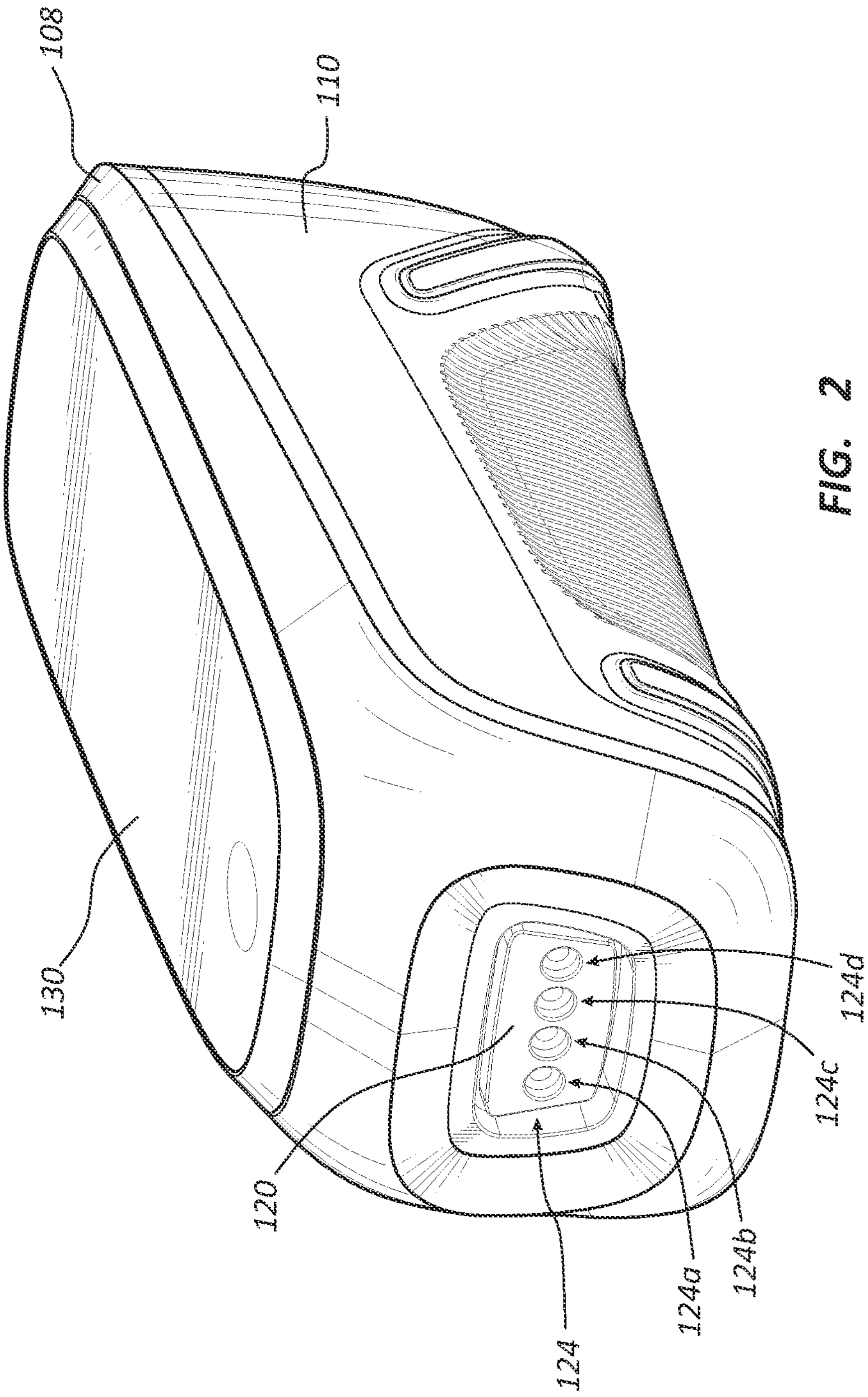
FIG. 2 shows a front perspective view of the pump assembly of FIG. 1.

FIG. 2 shows a front perspective view of the pump assembly 108. In some examples, the pump assembly 108 can include a housing 110 configured to house the various components of the pump assembly 108. The housing 110 can define a front opening through which a front manifold 120 can be accessed. The front manifold 120 can define a plurality of connection ports 124*a*, 124*b*, 124*c*, 124*d* (collectively "124"). The connection ports 124 can be configured to couple with the tubing 112 of FIG. 1 to form an air tight seal between the pump assembly 108 and the compression sleeve 104. In other words, port 124*a* can be configured to be in fluid communication with chamber 105*a*, port 124*b* can be configured to be in fluid communication with chamber 105*b*, port 124*c* can be configured to be in fluid communication with chamber 105*c*, and port 124*d* can be configured to be in fluid communication with chamber 105*d*. In some examples, the housing 110 and/or front manifold 120 can include an attachment mechanism to securely attach the tubing 112 to the connection ports 124. It will be appreciated that the tubing 112 can be securely coupled to the front manifold 120 by any suitable means capable of providing an airtight seal, including but in no way limited to, a fastener, an interference fit, a compressible fitting, and the like. The pump assembly 108 can also include a display 130, described in more detail below with regard to FIG. 4.

Figure 3:
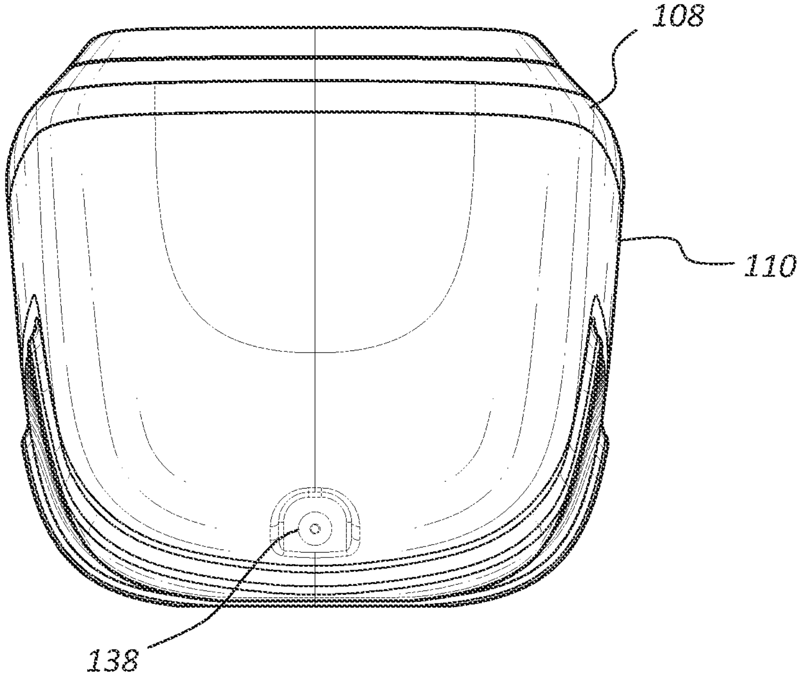
FIG. 3 shows a rear view of the pump assembly of FIG. 2.

As shown in FIG. 3, the pump assembly 108 can include a power plug 138 to connect to a power supply. The pump assembly 108 can be connected to a power source, such as a wall outlet, batteries, and the like, to power the various components of the pump assembly 108 (described in greater detail with regard to FIGS. 6 and 7). As discussed in greater detail below, the pump assembly 108 can be configured to generate air pressure and a vacuum. The pump assembly 108 can push air through the tubing 112 and into the compression sleeve 104.

Figure 4:
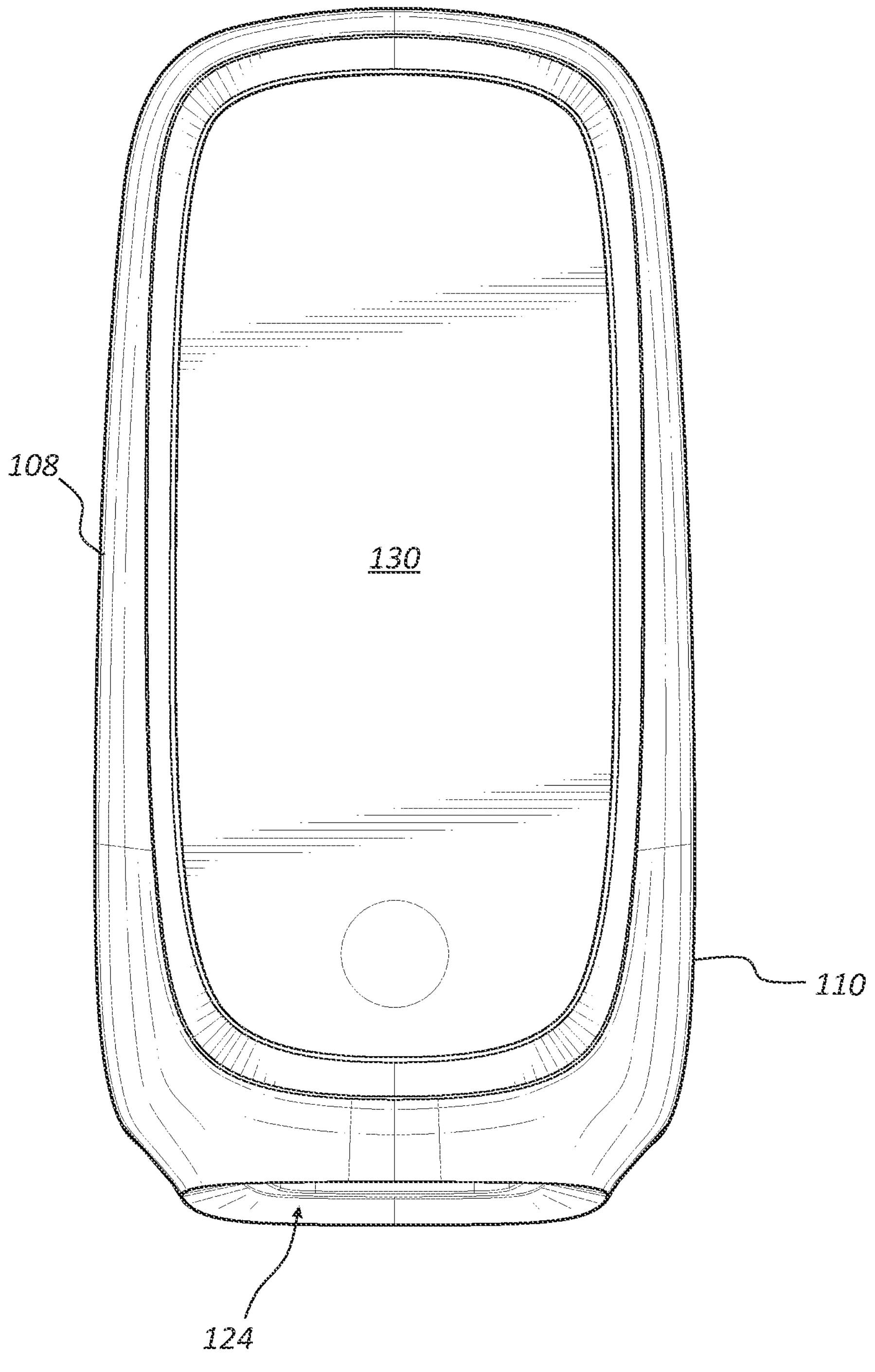
FIG. 4 shows a top view of the pump assembly of FIG. 2.

FIG. 4 shows a top view of the pump assembly including a display 130 on which a user interface can be presented. In some examples, the pump assembly 108 includes a processing unit (not shown) positioned within the pump housing 110, the display 130 being operationally coupled to the processing unit. In some examples, the display 130 can be positioned at least partially within the pump housing 110. The display 130 can define at least a portion of an exterior of the pump housing 110 (e.g., a top surface of the pump housing 110). The display 130 can be configured to display graphical-user interfaces executed by the processing unit.

The display 130 can be used to display a user interface associated with one or more programs executed on the processing unit. For example, the display 130 can display or graphically illustrate a control panel processing user interface, an instrument cluster user interface, a web browsing user interface, an infotainment interface, and so on.

The display 130 can be capable of presenting a user interface that includes icons (representing software applications), textual images, and/or motion images. In some examples, each icon can be associated with a respective function of the compression sleeve 104 that can be executed or adjusted by the processor. The display 130 can include a liquid-crystal display (LCD), light-emitting diode display (LED), organic light-emitting diode display (OLED), or the like. In some examples, the display 130 includes a touch input detection component and/or a force detection assembly that can be configured to detect changes in an electrical parameter (e.g., electrical capacitance value) when a user's appendage (acting as a capacitor) comes into proximity with the display 130 (or in contact with a transparent layer that covers the display 109). In some examples, the pump housing 110 includes buttons, switches, knobs, or other input mechanisms that can be manipulated by the user to adjust the operating parameters of the pump and compression sleeve 104. In some examples, the display 130 can provide status indicators relating to the modes, pressures in each pump, time elapsed, time remaining, activated chambers, etc.

In some examples, the user interface can be accessible on an electronic device, such as a smartphone, tablet, or computer. The processor can include a wireless communications component. A network/bus interface can couple the wireless communications component to the processor. The wireless communications component can communicate with electronic devices (e.g., smartphone, smartwatch, tablet, laptop, desktop) through any number of wireless communication protocols, including at least one of a global network (e.g., the Internet), a wide area network, a local area network, a wireless personal area network (WPAN), or the like. In some examples, the wireless communications component can transmit data to the other electronic devices over IEEE 802.11 (e.g., a Wi-Fi® networking system), Bluetooth® (IEEE 802.15.1), ZigBee®, Wireless USB, Near-Field Communication (NFC), a cellular network system (e.g., a 3G/4G/5G network such as UMTS, LTE, etc.), or the like.

In some examples, the compression sleeve 104 can include auxiliary therapy procedures, such as thermal therapy and vibration therapy. For instance, auxiliary devices (not shown) can be coupled to the compression sleeve 104 and can be configured to provide various therapy treatments to the body. The auxiliary devices can be configured to operate independent of the pump. For example, the auxiliary devices can be programmed to remain active even if their respective chamber 105 is not inflated. In some examples, the auxiliary devices can follow a programming schedule that is linked to the inflation schedule. For instance, an auxiliary device corresponding to a particular chamber 105 can be configured to activate only when that chamber 105 is inflated. The user can fully customize the operation of the auxiliary devices by adjusting, inter alia, the pattern, schedule, and operating parameters. This customization can be done through a user interface on the pump housing 110 or via a Bluetooth® connection (e.g., on a smartphone app).

Figure 5:
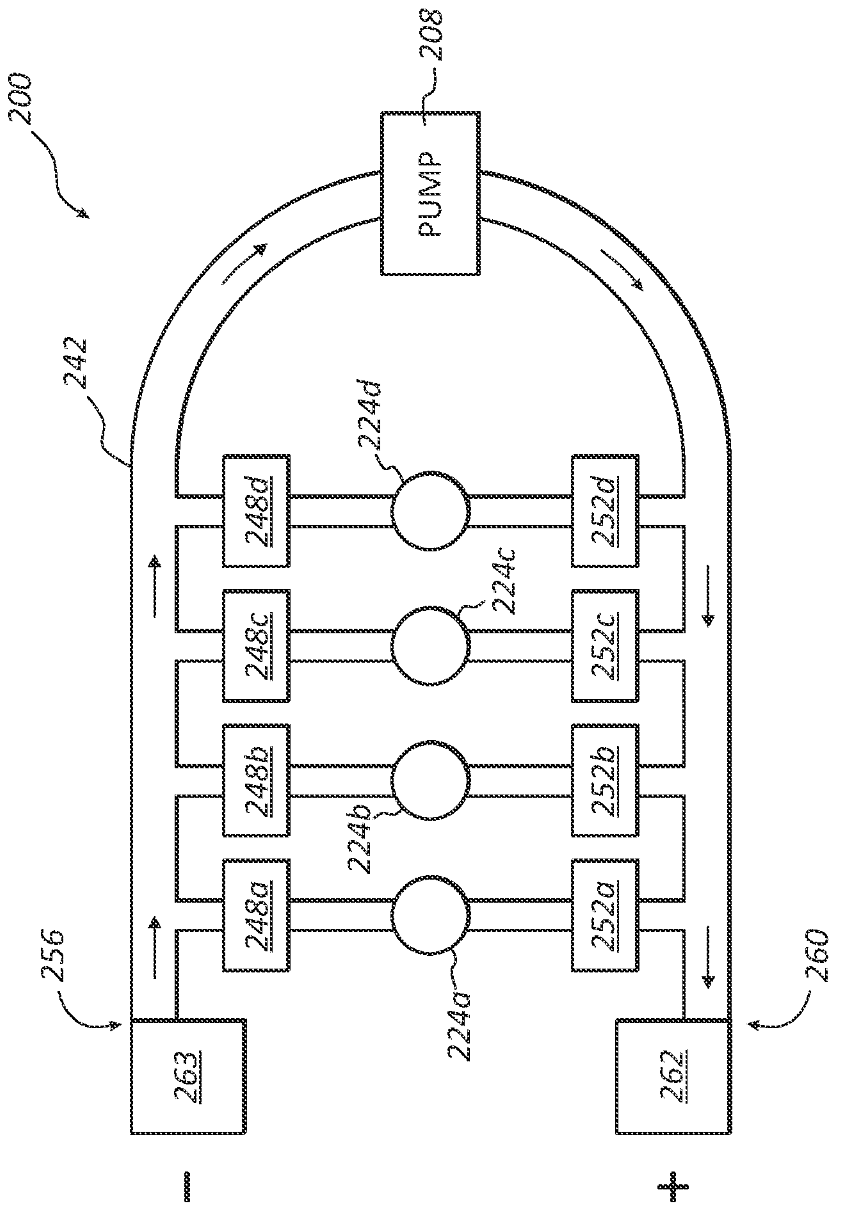
FIG. 5 shows a schematic diagram of an exemplary pump system.

FIG. 5 illustrates a schematic diagram of an example pressure flow system 200 that can be implemented using the pump assembly 108 described herein. The system 200 can include a pump motor 208, a plurality of release valves 248*a*, 248*b*, 248*c*, 248*d* (collectively "248"), a plurality of supply valves 252*a*, 252*b*, 252*c*, 252*d* (collectively "252"), and a plurality of ports 224*a*, 224*b*, 224*c*, 224*d* (collectively "224"). The ports 224 can correspond to ports 124 discussed with reference to FIG. 2, and can lead to separate chambers 105 of the compression sleeve 104. In some examples, the plurality of release valves 248 can be positioned downstream of the ports 224. In other words, the plurality of release valves 248 can be configured to control the flow of air exiting the chambers 105 and entering the system 200 through the ports 224. In some examples, the plurality of supply valves 252 can be positioned upstream of the ports 224. In other words, the plurality of supply valves 252 can be configured to control the flow of air entering the ports 224.

The release valves 248 and supply valves 252 can be solenoid valves or any other suitable valve for providing an airtight seal. The system 200 can further include a positive atmosphere valve 262 configured to control air exiting the system 200 and being released into the atmosphere. The system 200 can further include a negative atmosphere valve 263 configured to control the flow of air into the system 200 from the outside atmosphere. Pressure sensors can be positioned throughout the system 200 to monitor the pressure at any given location. In some examples, pressure sensors are located near the positive and negative atmosphere valves 262, 263 (i.e., near locations 260 and 256).

An example operation in which air is provided to each port 224 equally will now be described. The negative atmosphere valve 263 can be open while the positive atmosphere valve 262 is closed. The pump motor 208 can be turned on to generate air pressure within the system 200 by drawing outside air through the negative atmosphere valve 263. The release valves 248 can be closed and the supply valves 252 can be open. Thus, as the pump 208 generates air pressure, air from the outside is drawn into the conduit 242 through the negative atmosphere valve 263. Because the release valves 248 are closed, the air travels past the release valves 248 and through the open supply valves 252. Thereby providing air to the ports 224 and ultimately to the chambers 105.

If it is desired to not fill one of the chambers 105, the respective supply valve 252 of that chamber 105 can be shut. For example, if supply valve 252*a* was opened while the remaining supply valves 252*b*, 252*c*, 252*d* were closed, the system 200 would draw ambient air through the conduit 242 passed the release valves 248 and closed supply valves 252 and through the port 224*a* to fill or inflate the chamber 105*a*. It will be understood that using such a method each corresponding chamber 105 could be inflated either simultaneously or sequentially. Once a chamber 105 is at least partially inflated, the respective supply valve 252 can be shut to seal the inflated chamber 105.

Further, the system 200 can be configured to actively deflate or vacuum the chambers 105. Active deflation can enable the compression sleeve to be more easily and compactly stored when not in use and/or relieve induced pressure more quickly by actively evacuating the air from the selected chamber(s) 105. For example, supposing it is desired to deflate chamber 105*a*, the supply valve 252*a* can be closed and the release valve 248*a* can be opened while the pump is operating to create a vacuum through the port 224*a*. Further, the positive atmosphere valve 262 can be opened to expel the air from chamber 105*a* into the atmosphere. In some examples, one or more pressure sensors can be used to determine when a chamber 105 is fully deflated.

In some examples, air from one chamber 105 can be transferred to another. For example, if it is desired to transfer air from chamber 105*a* to chamber 105*b*, the supply valve 252*a* can be shut and the release valve 248*a* can be opened to deflate the chamber 105*a*. Meanwhile, supply valve 252*b* can be opened with the release valve 248*b* closed. Assuming the atmosphere valves 262 and 263 are closed and the pump motor 208 is running, air will be vacuumed from the chamber 105*a* and directed through supply valve 252*b* into the port 224*b* and ultimately to chamber 105*b*. In some examples, a chamber 105 can be filled using a combination of outside air and air transferred from a different chamber 105.

In this manner, each chamber 105 can be isolated and independently operated using the system 200. The system 200 allows the chambers 105 to be inflated and/or deflated in any pattern or sequence. The described system allows a user to fully customize the sequence, timing, duration, and the amount of pressure in each chamber at any given time. It will be understood that the system 200 is merely an example schematic diagram and that various other configurations and patterns or implementations can be used to achieve a similar goal of isolated pumping chambers.

Figure 6:
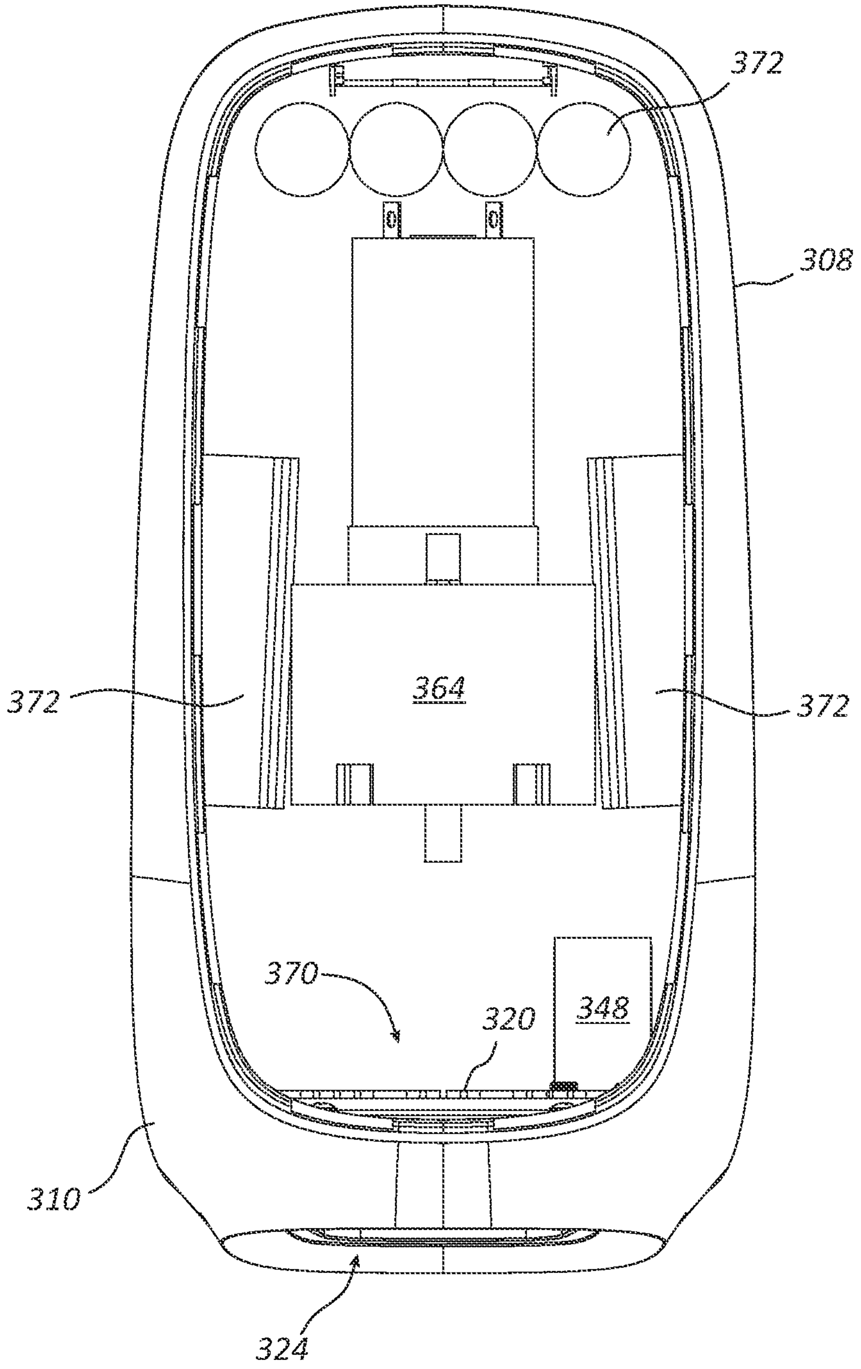
FIG. 6 shows a top view of portions of the exemplary pump assembly.

FIG. 6 shows a partial cross-sectional top view of a pump assembly 308, according to one exemplary embodiment. The pump assembly 308 can be substantially similar to pump assembly 108 and can incorporate the structure and teaching of system 200 of FIG. 5. The pump assembly 308 can include a pump housing 310, a manifold 320, a plurality of valves 348 (for simplicity, only one valve 348 is shown in FIG. 6), a pump motor 364, and rechargeable batteries 372. In some examples, the valves 348 can be positioned in a space 370 located between the manifold 320 and pump 364. Various components of the pump assembly 308 have been removed for simplicity.

Figure 7:
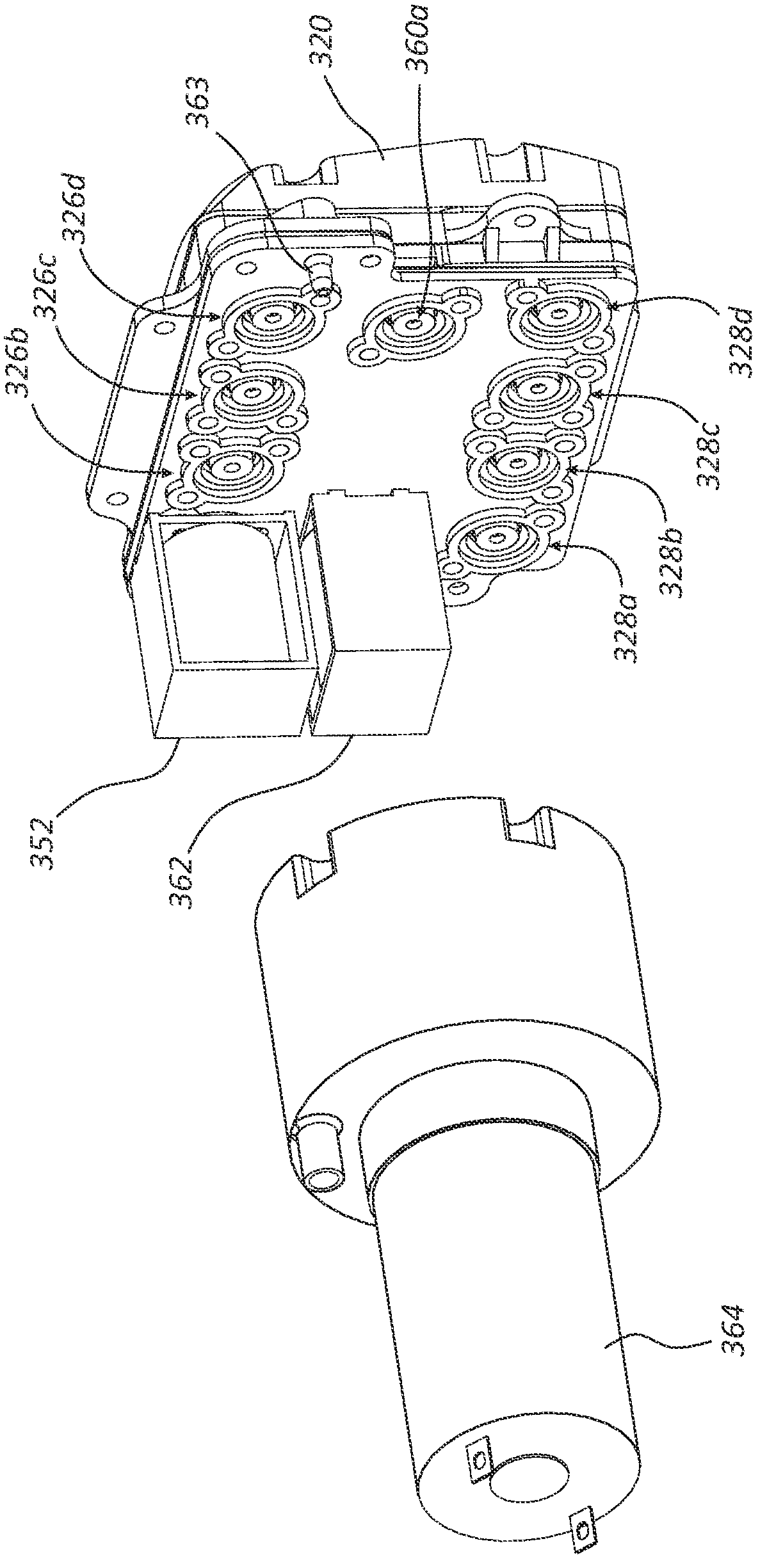
FIG. 7 shows a side perspective view of a motor, valves, and manifolds of the exemplary pump assembly.

FIG. 7 illustrates a partially exploded view of select components of the pump assembly 308, according to one exemplary embodiment. As illustrated, the motor 364 can be positioned rear of the manifold 320. In some examples, the pump motor 364 can be a DC motor capable of operating at 16-18 cubic feet per minute (CFM). The manifold 320 can define a plurality of positive pressure apertures 326*b*, 326*c*, 326*d* (collectively "326") configured to receive positive pressure supply valves 352 and a plurality of negative pressure apertures 328*a*, 328*b*, 328*c*, 328*d* (collectively "328") configured to receive negative pressure release valves (not shown in FIG. 7). Valve 362 can be configured to control air entering the system from the atmosphere. Further details of the manifold 320 are provided below with respect to FIGS. 8-10.

Figure 8:
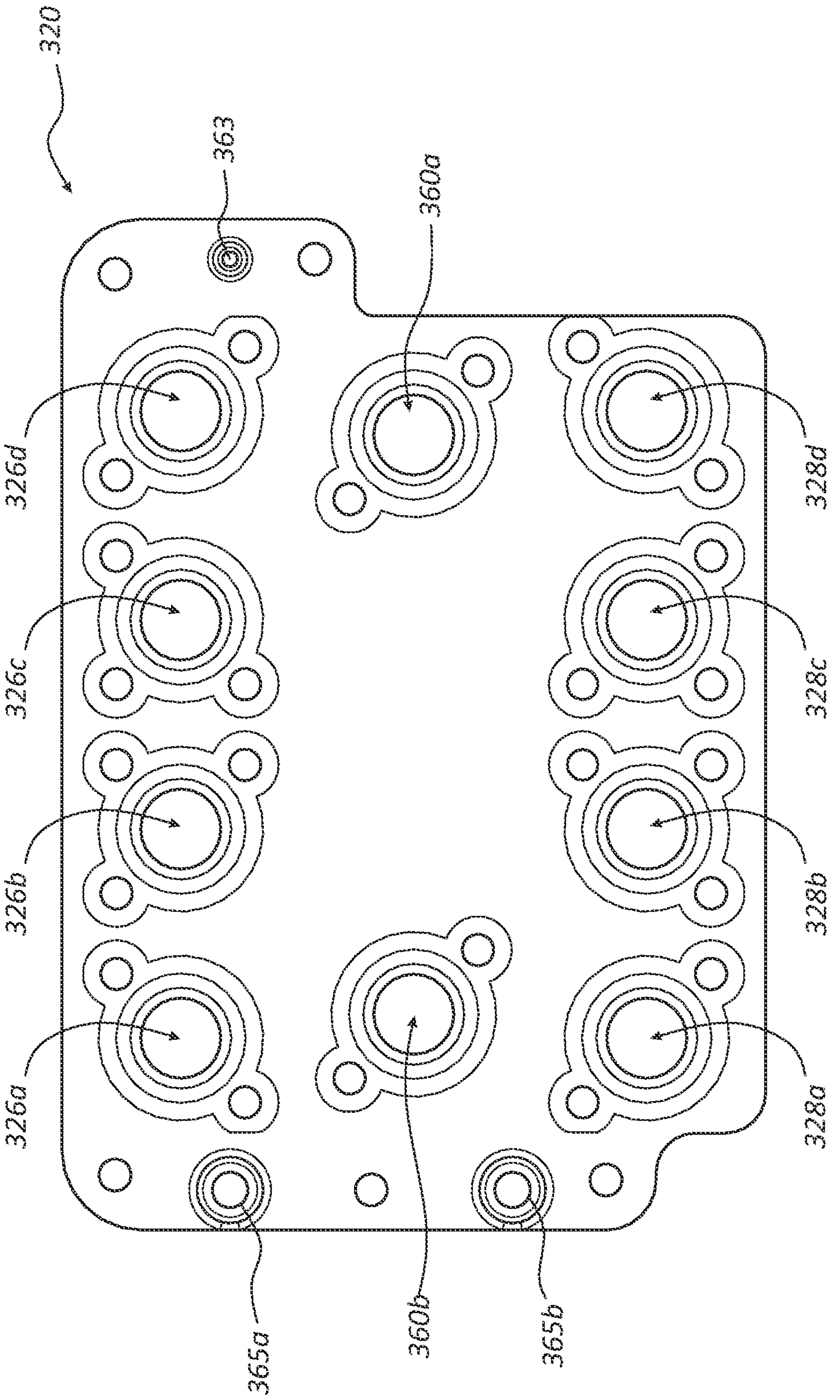
FIG. 8 shows a front view of a manifold of the exemplary pump assembly.

FIG. 8 illustrates a rear panel of the rear manifold 320. As discussed in part above, the manifold 320 can define a plurality of positive pressure apertures 326 configured to receive positive pressure supply valves (not shown in FIG. 8), and a plurality of negative pressure apertures 328 configured to receive negative pressure release valves (not shown in FIG. 8).

The rear panel of the manifold 320 can further define a positive supply nozzle 365*a* and a negative release nozzle 365*b*. The positive supply nozzle 365*a* can facilitate transfer of air pressure from the pump to the positive pressure apertures 326 and the negative release nozzle 365*b* can facilitate transfer of air from the negative pressure apertures 328 to the pump. The rear panel of the manifold 320 can further define a negative atmosphere aperture 360*b* through which air from the outside is pumped into the system, and a positive atmosphere aperture 360*a* though which air is pumped out of the system into the atmosphere. In some examples, the rear panel of the manifold 320 can define a spigot leading to a pressure sensor (not shown). Further details of the manifold 320 are provided below with respect to FIGS. 9-10.

Figure 9:
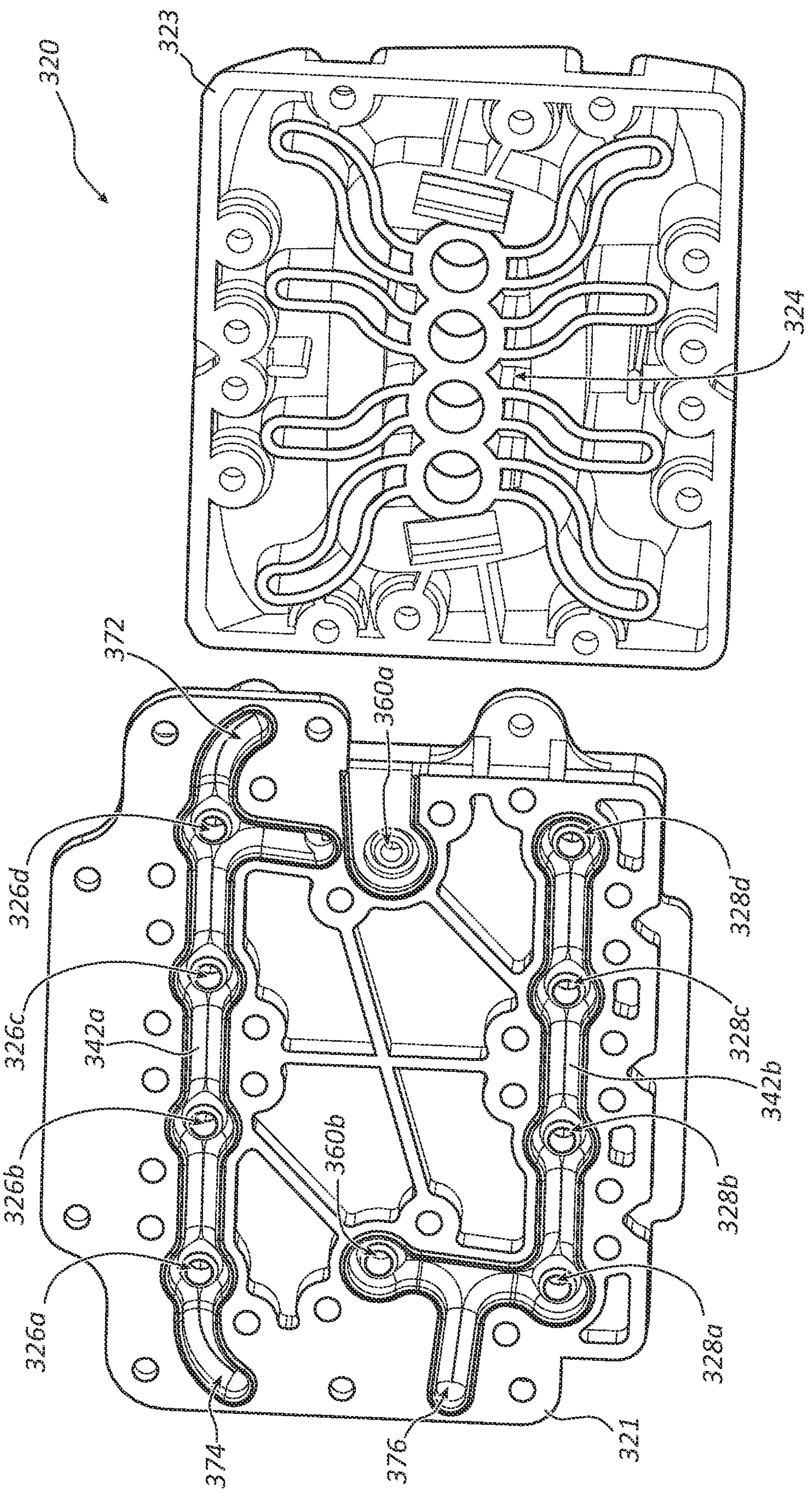
FIG. 9 shows a rear exploded view of a manifold of the exemplary pump assembly.

FIG. 9 illustrates a rear partially exploded view of the manifold 320 including a middle section 321 and a front section 323. As illustrated, the rear cover panel (shown in FIG. 8) has been removed to expose the middle section 321 of the manifold 320. The middle section 321 can at least partially define the positive pressure apertures 326 and negative pressure apertures 328. The middle section 321 can define an upper conduit 342*a* and a lower conduit 342*b*. The upper conduit 342*a* can be configured to provide a pathway between the positive pressure apertures 326. The lower conduit 342*b* can be configured to provide a pathway between the negative pressure apertures 328. In some examples, the lower conduit 342*b* can at least partially define the negative atmosphere aperture 360*b* through which air from the outside is pumped into the system. The upper conduit 342*a* can at least partially define the positive atmosphere aperture 360*a* though which air is pumped out of the system into the atmosphere.

In some examples, when a supply valve 352 is closed, a plunger covers or is forced into the positive pressure aperture 326 to seal off that particular chamber. Air can then flow around the plunger of the supply valve 352 to access the remaining positive pressure apertures (i.e., the upper conduit 342*a* allows air to circumvent closed valves). The lower conduit 342*b* can be similarly shaped to allow air to circumvent closed valves.

In some examples, the positive nozzle 365*a* of FIG. 8 directly guides air into the upper conduit 342*a* at location 374. Likewise, at location 376, air can be withdrawn from the lower conduit 342*b* through the negative nozzle 365*b*. At location 372, air can be fed to the pressure sensor spigot 363 (shown in FIG. 8). Further details of the manifold 320 are provided below with respect to FIG. 10.

Figure 10:
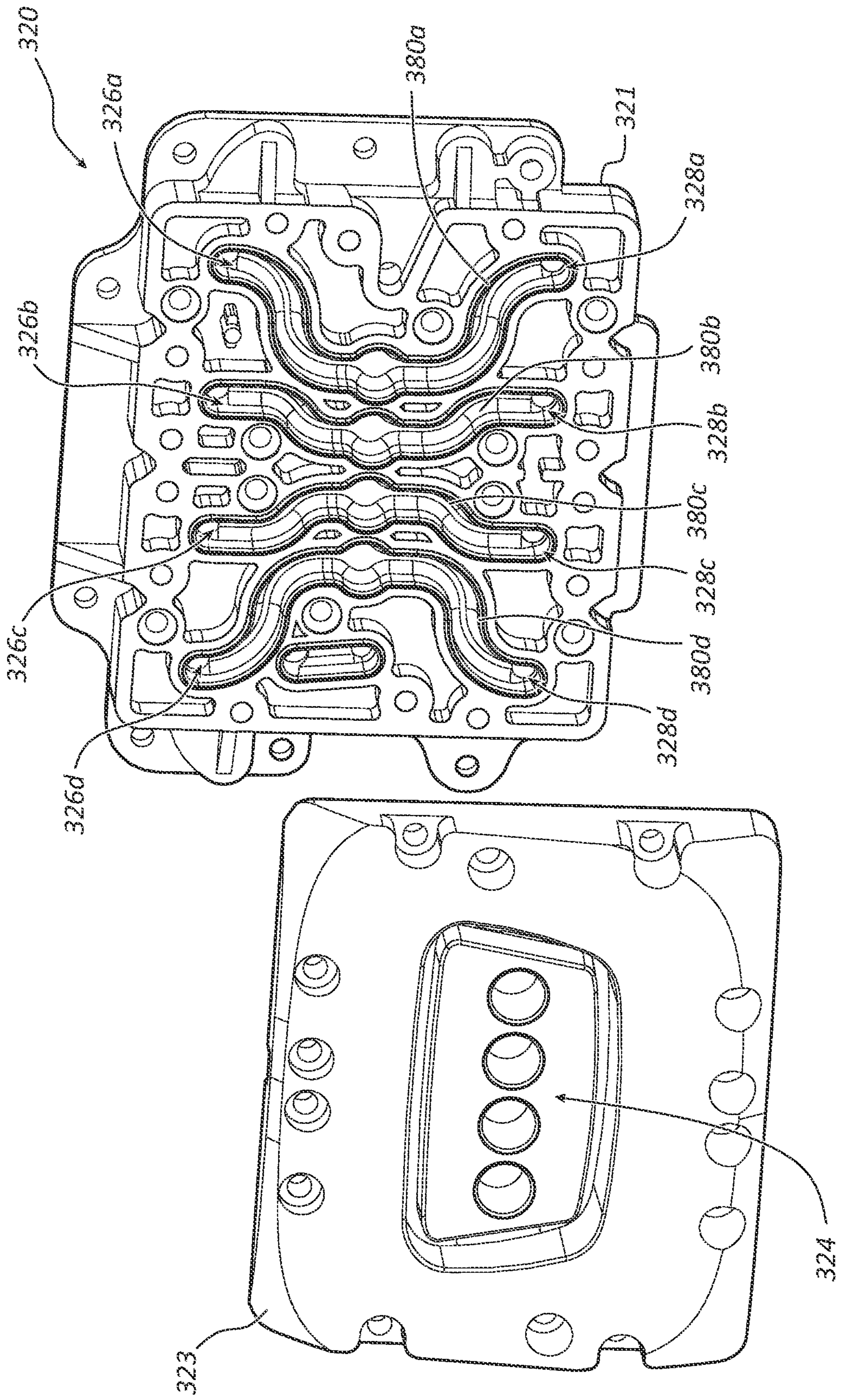
FIG. 10 shows a front exploded view of the manifolds of FIG. 9.

FIG. 10 illustrates a front perspective partially exploded view of the front section 323 and the middle section 321 of the manifold 320. As illustrated, the front side of the middle section 321 can define a plurality of port conduits 380*a*, 380*b*, 380*c*, 380*d* (collectively "380"). In some examples, at an upper end of each port conduit 380 is located the positive pressure apertures 326. In some examples, at a lower end of each port conduit is located the negative pressure apertures 328. The center of the port conduits 380 can lead to the ports 324 defined by the front section 323 of the manifold 320.

Figure 11:
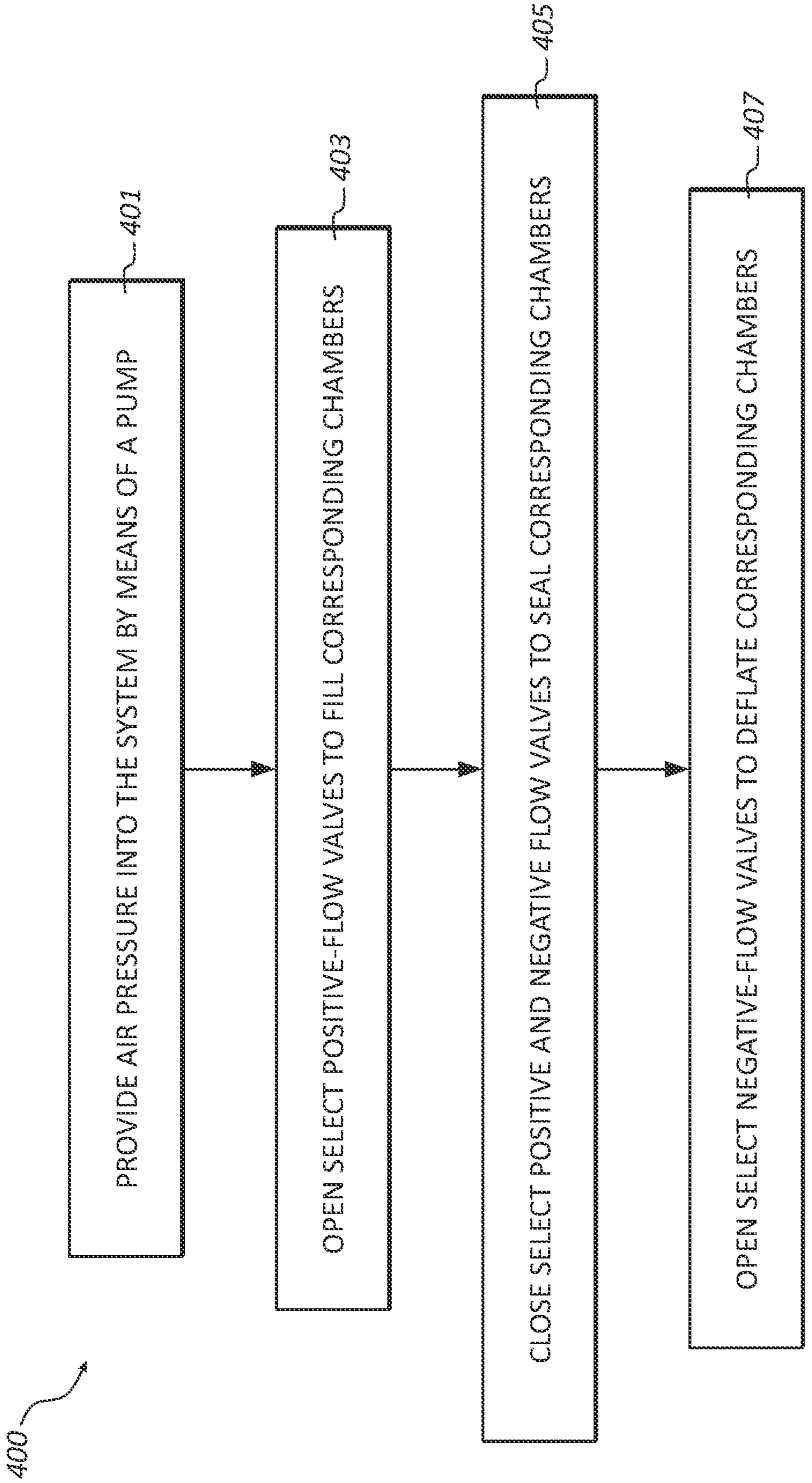
FIG. 11 shows an exemplary process flow diagram of the physical therapy system of FIG. 1.

FIG. 11 shows a process flow diagram 400 of operating a compression sleeve 104 using the techniques described herein. At step 401, air pressure can be provided into the system by means of a pump. At step 403, select positive-flow valves can be opened to fill the corresponding chambers. At step 405, certain positive and negative flow valves can be closed to seal corresponding chambers. At step 407 certain negative flow valves can be opened to deflate corresponding chambers.

In some examples, the compression sleeve 104 can include auxiliary therapy procedures, such as thermal therapy and vibration therapy. For instance, auxiliary devices (not shown) can be coupled to the compression sleeve 104 and can be configured to provide various therapy treatments to the body. The auxiliary devices can be configured to operate independent of the pump. For example, the auxiliary devices can be programmed to remain active even if their respective chamber 105 is not inflated. In some examples, the auxiliary devices can follow a programming schedule that is linked to the inflation schedule. For instance, an auxiliary device corresponding to a particular chamber 105 can be configured to activate only when that chamber 105 is inflated. The user can fully customize the operation of the auxiliary devices by adjusting, inter alia, the pattern, schedule, and operating parameters. This customization can be done through a user interface on the pump housing 110 or via a Bluetooth connection (e.g., on a smartphone app).

In some examples, the physical therapy system described herein can include thermal therapy systems, such as thermotherapy (heat) and cryotherapy (cold). Cold treatment can reduce inflammation by decreasing blood flow. Heat treatment can promote blood flow and help muscles relax. Alternating heat and cold can help reduce exercise-induced muscle pain and induce healing. The thermal therapy system can be configured to work in concert with the pump or independently. For instance, the thermal therapy system can be configured to provide heat and/or cold to an inflated chamber 105. In some examples, the thermal therapy system continuously provides heat and/or cold, regardless of the air pressure within the compression sleeve 104.

In some examples, the compression sleeve 104 can include electrical heating wires (not shown) that heat up when provided with electricity. The heating wires can run throughout the compression sleeve 104, either inside or exterior to the compression sleeve 104. The system 100 can include a control unit for controlling the temperature of the heating wires.

In some examples, the pump assembly 108 can be configured to heat and/or cool the air that is being provided to the inflatable chambers 105. In this manner, the chambers 105 can transfer heat and/or cold to the user's limb when inflated. In some examples, liquids or gels can be used to provide thermal therapy to the body part. The liquids or gels can be circulated throughout portions of the compression sleeve 104. In some examples, the pump assembly 108 is configured to circulate the liquids or gels in addition to air via separate tubing. In some examples, instead of providing pressure by means of air, the pump assembly 108 is configured to circulate the liquids or gels to pressurize the compression sleeve. In this manner, the compression therapy and also the thermal therapy can be accomplished with a single system.

In some examples, the system includes a plurality of pumps (not shown) located directly on the compression sleeve 104 itself. One or more pumps can be in fluid communication with one or more chambers 105. In some examples, the individual pumps comprise batteries, such as rechargeable batteries, to allow the remote pumps to operate while being removed from an external power source. In this way, the compression sleeve 104 can provide compression therapy without having to be connected to an external pump or an external power source. In some examples, the pump assembly 108 can be operated via wireless connection. The pump assembly 108 can be communicatively connected to the user interface, either on the pump assembly 108 or on a user's mobile or handheld device In some examples, the status of the inflatable chambers 105 can be used to notify the user of various operating conditions of the system. For example, specific inflatable chamber 105 can begin to pulse with air pressure in a distinct pattern to alert the user to an operating mode, for instance, that a particular chamber 105 of the compression sleeve 104 is about to inflate or deflate.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. An apparatus for applying pressure to a body part, the apparatus comprising:
- a sleeve configured to at least partially surround the body part, the sleeve comprising a plurality of inflatable sections; and
- a pump assembly, the pump assembly comprising:
  - a pump housing;
  - a pump disposed within the pump housing; and
  - a plurality of channels disposed within the pump housing, each channel configured to be in fluid communication with the pump and a respective inflatable section of the plurality of inflatable sections, wherein each channel comprises:
    - a supply valve configured to regulate incoming air entering the respective inflatable section; and
    - a release valve configured to regulate outgoing air exiting the respective inflatable section, wherein an outlet of the release valve flows into an inlet of the pump, wherein an outlet of the pump flows into an inlet of the supply valve and a positive atmospheric valve.

2. The apparatus of claim 1, wherein the supply valve and the release valve of the plurality of channels comprise solenoid valves.

3. The apparatus of claim 1, wherein the pump is operated by a DC motor.

4. The apparatus of claim 1, further comprising a user interface.

5. The apparatus of claim 1, wherein the outgoing air can be transferred from one inflatable section to another one of the plurality of inflatable sections.

6. The apparatus of claim 1, further comprising a pressure sensor to monitor pressure within the pump assembly.

7. The apparatus of claim 1, wherein the pump assembly is configured to inflate the respective inflatable section of the plurality of inflatable sections by opening the supply valve and closing the release valve.

8. The apparatus of claim 1, wherein the pump assembly is configured to actively deflate the respective inflatable section of the plurality of inflatable sections by opening the release valve and closing the supply valve.

9. A method of applying pressure to a body part, the method comprising:
- providing a pump disposed within a pump housing configured to generate air pressure;
- providing a sleeve configured to at least partially surround the body part, the sleeve comprising a plurality of inflatable chambers configured to be in fluid communication with the pump;
- providing pathways disposed within the pump housing between a supply valve and a return valve to each inflatable chamber of the plurality of inflatable chambers, the pathways providing fluid communication between outlets of the return valves and an inlet of the pump, the outlets of the return valves being upstream of the inlet of the pump, inlets of the supply valves and a positive atmospheric valve being downstream of an outlet of the pump; and
- varying the air pressure within each inflatable chamber through operation of the pump, the supply valves, and the return valves.

10. The method of claim 9, further comprising actively deflating each inflatable chamber of the plurality of inflatable chambers with the pump.

* * * * *